(12) United States Patent
Purushe

(10) Patent No.: US 11,076,188 B1
(45) Date of Patent: Jul. 27, 2021

(54) SIZE COMPARISON-BASED SEGMENT CANCELLATION

(71) Applicant: Twitch Interactive, Inc., San Francisco, CA (US)

(72) Inventor: Nikhil Purushe, San Francisco, CA (US)

(73) Assignee: Twitch Interactive, Inc., San Francisco, CA (US)

( * ) Notice: Subject to any disclaimer, the term of this patent is extended or adjusted under 35 U.S.C. 154(b) by 0 days.

(21) Appl. No.: 16/707,768

(22) Filed: Dec. 9, 2019

(51) Int. Cl.
  *H04N 21/2662* (2011.01)
  *H04N 21/24* (2011.01)
  *H04N 21/234* (2011.01)
  *H04L 29/06* (2006.01)

(52) U.S. Cl.
  CPC ....... *H04N 21/2662* (2013.01); *H04L 65/607* (2013.01); *H04N 21/23406* (2013.01); *H04N 21/2407* (2013.01)

(58) Field of Classification Search
  CPC ........... H04N 21/2662; H04N 21/2407; H04N 21/23406; H04L 65/607
  See application file for complete search history.

(56) References Cited

U.S. PATENT DOCUMENTS

| | | | |
|---|---|---|---|
| 9,300,710 B2* | 3/2016 | Winterrowd | H04L 65/80 |
| 9,324,375 B1* | 4/2016 | Casalena | H04L 65/607 |
| 9,571,702 B2 | 2/2017 | Sullivan et al. | |
| 9,756,102 B2* | 9/2017 | Mao | H04L 65/4084 |
| 9,788,077 B1 | 10/2017 | Shen et al. | |
| 9,813,740 B2 | 11/2017 | Panje et al. | |
| 10,313,412 B1 | 6/2019 | Hall et al. | |
| 10,326,814 B1 | 6/2019 | Hall et al. | |
| 10,397,291 B1 | 8/2019 | Hall et al. | |
| 2004/0001547 A1 | 1/2004 | Mukherjee | |
| 2006/0083315 A1 | 4/2006 | Sato et al. | |
| 2006/0233247 A1 | 10/2006 | Visharam et al. | |
| 2006/0233259 A1 | 10/2006 | Chou et al. | |

(Continued)

OTHER PUBLICATIONS

Shichang Xu, Subhabrata Sen, Z. Morley Mao, and Yunhan Jia. 2017. Dissecting VOD services for cellular: performance, root causes and best practices. In Proceedings of the 2017 Internet Measurement Conference (IMC '17). 220-234. (Year: 2017).*

(Continued)

*Primary Examiner* — John M Macilwinen
(74) *Attorney, Agent, or Firm* — BakerHostetler

(57) ABSTRACT

During download of a first video segment, a buffer empty condition may be detected that interrupts playing of the first video segment. A remaining data size may be determined corresponding to a remaining portion of the first video segment that has not been downloaded when the buffer empty condition occurs. A total data size may be determined corresponding to a second video segment in its entirety, and it may be determined that the remaining data size exceeds the total data size. The download of the first video segment may then be canceled, and the second video segment may be downloaded. A start of a replacement portion of the second video segment may be identified that corresponds to a start of the remaining portion of the first video segment. Playing of the second video segment may be initiated from the start of the replacement portion of the second video segment.

20 Claims, 7 Drawing Sheets

(56) References Cited

U.S. PATENT DOCUMENTS

| | | | |
|---|---|---|---|
| 2008/0273094 A1 | 11/2008 | Kunieda | |
| 2009/0307367 A1* | 12/2009 | Gigliotti | H04L 67/02 709/231 |
| 2009/0316795 A1 | 12/2009 | Chui et al. | |
| 2012/0189278 A1 | 7/2012 | Oshima et al. | |
| 2013/0089142 A1 | 4/2013 | Begen et al. | |
| 2014/0143439 A1* | 5/2014 | Ramamurthy | H04N 21/2407 709/231 |
| 2016/0105724 A1 | 4/2016 | Bloch et al. | |
| 2016/0191585 A1* | 6/2016 | Ramamurthi | H04L 43/0888 709/231 |
| 2016/0212189 A1* | 7/2016 | Zhang | H04L 65/4076 |
| 2016/0330453 A1 | 11/2016 | Zhang et al. | |
| 2017/0041238 A1* | 2/2017 | Do | H04L 47/25 |
| 2017/0208350 A1 | 7/2017 | Herrick et al. | |
| 2017/0257674 A1 | 9/2017 | Horita et al. | |
| 2017/0262707 A1 | 9/2017 | Zhao | |
| 2020/0195997 A1 | 6/2020 | Yoshikawa et al. | |

OTHER PUBLICATIONS

U.S. Appl. No. 16/877,744, filed May 9, 2020, Purushe.
U.S. Appl. No. 16/877,744; Non-Final Office Action; dated Feb. 26, 2021; 7 pages.
U.S. Appl. No. 16/877,744; Notice of Allowance; dated Jun. 15, 2021; 6 pages.

\* cited by examiner

SIZE COMPARISON-BASED SEGMENT CANCELLATION

BACKGROUND

The popularity of video streaming has increased rapidly in recent years. In some examples, video of a live event, such as a video game, news event, sporting event, etc. may be captured and streamed to viewers over one or more networks. In these and other cases, it may be desirable for video to be transmitted with low latency, for example such that actions within video may be seen by viewers while they are still occurring or shortly after their occurrence. This may, in some cases, be particularly advantageous when users are commenting, chatting or otherwise describing actions within these live events. One commonly employed streaming technique is adaptive bitrate (ABR) streaming, in which a video stream is encoded using multiple versions that may differ with respect to various image quality attributes (e.g., bitrates, resolutions, profiles, frame rates, etc.). These different image quality versions may sometimes be referred to as different renditions of the video content. Each recipient of a transmission may then determine which version to download depending on various transmission characteristics, such as network conditions (e.g., available network bandwidth, throughput, etc.). In ABR streaming, video streams are encoded into small segments. For different segments, recipients may optionally dynamically switch between versions, such as based on whether network conditions are improving or declining.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
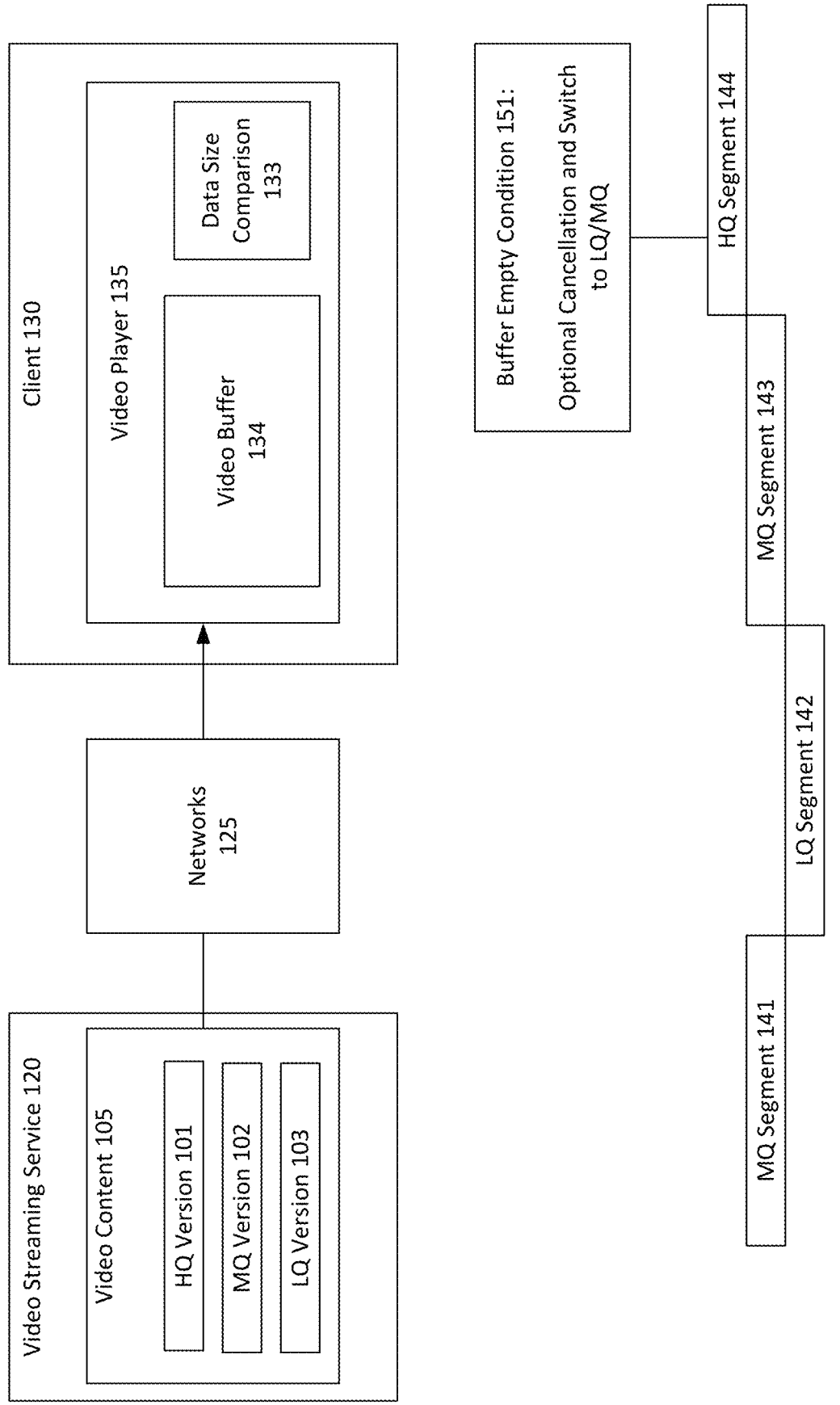
FIG. 1 is a diagram illustrating an example size comparison-based segment cancellation system that may be used in accordance with the present disclosure.

Techniques for size comparison-based segment cancellation are described herein. In some examples, video content may be transmitted from a video streaming service to one or more video players over one or more communications networks. In some examples, a streamer may capture video content and transmit the video content to a video streaming service. The video streaming service may then, in turn, transmit the video to a number of video players for display to viewers. In one specific example, a streamer may be a playing a video game and simultaneously capturing and transmitting video of the game that he or she is playing. In some examples, the video content may be transmitted to viewers and played using live streaming techniques. For example, video content of an event (e.g., video game) may be transmitted to viewers, and at least part of the video content may be played while the event is still occurring (e.g., while the video game is still being played by the streamer), albeit with some small amounts latency between the time that video content is captured by the provider and the time that the video is eventually played to viewers.

The video may be transmitted using adaptive bitrate (ABR) streaming techniques, in which a video stream is encoded using multiple versions that may differ with respect to various image quality attributes (e.g., bitrates, resolutions, profiles, frame rates, etc.). These different image quality versions may sometimes be referred to as different renditions of the video content. Each recipient of a transmission may then determine which version to download depending on various transmission characteristics, such as network conditions (e.g., available network bandwidth, throughput, etc.). In ABR streaming, video streams are encoded into small segments. For different segments, recipients may optionally dynamically switch between versions, such as based on whether network conditions are improving or declining. One problem related to ABR streaming is that a buffer empty condition may sometimes occur during downloading of a video segment, such as when network conditions are rapidly declining. This may occur, for example, when a viewer (or someone on the viewer's home or local network) begins to download other content during the download of the video content. In some cases, to help reduce the likelihood of these buffer empty events, a portion of video content may be reserved in a video buffer during the video transmission. However, storing larger amounts of video in the buffer may tend to increase the latency of the transmission, which may be particularly problematic for live streaming scenarios in which minimal latency is desired. Thus, buffer empty conditions may be more common in live streaming contexts in which less data tends to be reserved in the buffer. It is noted, however, that buffer empty conditions may also occur in non-live streaming contexts.

In some examples, to help prevent buffer empty conditions, when a video player detects that network conditions are declining, the video player may, for a next requested segment, switch from a higher image quality version to a lower image quality version. While this switch will reduce the quality of the video, the smaller data size of the lower image quality version may sometimes prevent a buffer empty condition that may otherwise have occurred if the higher image quality had been maintained. However, in some cases, such as when a video player experiences a rapid and/or unexpected decline in network conditions, a buffer empty condition may occur during a segment download, before the recipient has an opportunity to switch down to the lower quality version for the next segment. If the bandwidth reduction is significant, this remaining download time for the currently requested segment can cause long re-buffering times, potentially resulting in user dissatisfaction and abandonment.

In order to alleviate these and other problems, the techniques described herein may, such as in response to a buffer empty condition, allow a recipient to selectively cancel delivery of a remaining portion of a current segment and instead download a lower quality segment to substitute the remaining portion of the current segment. Specifically, in some examples, when a buffer empty condition occurs during download of a first version of a segment, the video player may determine a remaining data size of a remaining portion of the first version of the segment that has not yet been downloaded. The video player may also identify a second version of the segment that has a lower quality than the first version. The video player may then determine a total data size of second version of the segment in its entirety. The video player may then compare the remaining data size of the remaining portion of the first version to the total data size of second version. If the total data size of second version is greater than or equal to the remaining data size of the remaining portion of the first version, then there may be no benefit to switching to the second version. In this scenario, the video player may simply wait for the remaining portion of the first version to download and then resume play of the first version. By contrast, if the remaining data size of the remaining portion of the first version is greater than the total data size of second version, then switching to the second version may reduce the re-buffering period and allow the video to resume faster. In this scenario, the video player may cancel the download of the first version (such that the remaining portion of the first version is not downloaded) and may instead download the second version as a substitute for the remaining portion of the first version. Upon receipt of the second version, the video player may skip past (i.e., without playing) an initial portion of the second version that corresponds to an initial portion of the first version that was already downloaded and played. The video player may advance to the current playback position (i.e., the playback position at which the buffer empty condition occurred) in the second version and resume playback of the video content within the second version moving forward from current playback position.

In some examples, there may be multiple available versions with lower image qualities than the current version that is being downloaded when the buffer empty condition occurs. In these scenarios, the video player may, for example, perform the above described data size comparison for more than one (and in some cases all) of those lower quality versions to determine which, if any, of those lower quality versions have a total data size that is exceeded by the remaining data size of the current version. Also, in some examples, the video player may maintain both a long-term bandwidth estimate and a short-term bandwidth estimate. In some cases, the long-term bandwidth estimate and the short-term bandwidth estimate may be based on respective sliding time windows relative to a current time. For example, the long-term bandwidth estimate may be repeatedly updated based on a longer prior time window (e.g., bandwidth conditions over the last ten seconds), while the short-term bandwidth estimate may be repeatedly updated based on a shorter prior time window (e.g., bandwidth conditions over the last two seconds). In some cases, the long-term bandwidth estimate may be used to select (and optionally switch between) versions for each video segment under normal operating conditions (i.e., when the video content is not experiencing a buffer empty condition). By contrast, the short-term bandwidth estimate may be used to select (and optionally switch between) versions when a buffer empty condition has occurred. In particular, in some examples, the long-term bandwidth estimate may be preferable for use in normal operating conditions because it may be less susceptible to temporary changes in bandwidth. By contrast, in some examples, the short-term bandwidth estimate may be preferable for use in buffer empty conditions because it may provide a more accurate estimate of a current decline in bandwidth that has caused the buffer empty condition. In particular, in some examples, when a buffer empty condition has occurred and it is determined that multiple lower quality versions have a total data size that is exceeded by the remaining data size of the current version, the short-term bandwidth estimate may be used to select one of those multiple lower quality versions to which to switch and replace the remaining portion of the current higher quality version.

FIG. 1 is a diagram illustrating an example size comparison-based segment cancellation system that may be used in accordance with the present disclosure. In the example of FIG. 1, video content 105 is transmitted from a video streaming service 120 to a video player 135 at a client 130 for display to a viewer. Although only a single video player 135 at a single client 130 is shown in FIG. 1, the video content 105 may optionally be concurrently transmitted from the video streaming service 120 to any number of additional clients and video players. The video content 105 may be transmitted from video streaming service 120 to video player 135 over one or more networks 125, for example one or more local area networks (LAN's) and/or one or more wide area networks (WAN's), such as the Internet. Additionally, the video content 105 is transmitted from video streaming service 120 to video player 135 using streaming transmission techniques, in which portions of transmitted content are received and played while subsequent portions of the transmitted content are being transmitted.

In some examples, a streamer (not shown in FIG. 1) may capture the video content and transmit the video content 105 to the video streaming service 120. The video streaming service 120 may then, in turn, transmit the video content 105 to video player 135 (and any number of additional video players) for display to viewers. In one specific example, a streamer may be a playing a video game and simultaneously capturing and transmitting video of the game that he or she is playing. In some examples, the video content 105 may be transmitted to viewers and played using live streaming techniques. For example, video content of an event (e.g., video game) may be transmitted to viewers, and at least part of the video content may be played while the event is still occurring (e.g., while the video game is still being played by the streamer), albeit with some small amounts latency between the time that video content is captured by the provider and the time that the video is eventually played to viewers.

In the example of FIG. 1, the video content 105 is transmitted from video streaming service 120 to video player 135 (and optionally other video players) using adaptive bitrate (ABR) streaming techniques, in which a video stream is encoded using multiple versions that may differ with respect to various image quality attributes (e.g., bitrates, resolutions, profiles, frame rates, etc.). These different image quality versions may sometimes be referred to as different renditions of the video content. Each recipient of the transmission may then determine which version to download depending on various transmission characteristics, such as network conditions (e.g., available network bandwidth, throughput, etc.). For example, as shown in FIG. 1, the video content is encoded into a high-quality (HQ) version 101, a medium-quality (MQ) version 102 and a low-quality (LQ) version 103. In one specific example, HQ version 101 could have a resolution of 1080p, MQ version 102 could have a resolution of 720p, and LQ version 103 could have a resolution of 480p. In some examples, different transmission characteristics may exist with respect to transmission of video content 105 to different recipients. For example, a network connection between video streaming service 120 and video player 135 may be experiencing favorable conditions, while a network connection between video streaming service 120 and another video player may simultaneously be experiencing poor conditions. Additionally, as will be described in detail below, network conditions for each individual recipient may also change over time during the course the transmission of video content 105.

In ABR streaming, video streams are encoded into small segments. For different segments, individual recipients may optionally dynamically switch between versions, such as based on whether network conditions are improving or declining. In the example of FIG. 1, video player 135 initiates the transmission of video content 105 by requesting a medium-quality segment 141 of medium-quality version 102 from the video streaming service 120. The video player 135 may then determine that network conditions are declining, such as based on detecting a decline in bandwidth of one or more networks 125. The video player 135 may then switch down from medium-quality version 102 to low-quality version 103, such as by requesting low-quality segment 142 of low-quality version 103 as the next segment. The video player 135 may then determine that network conditions are improving, such as based on detecting an improvement in bandwidth of one or more networks 125. The video player 135 may then switch back up from low-quality version 103 to medium-quality version 102, such as by requesting medium-quality segment 143 of medium-quality version 103 as the next segment. The video player 135 may then determine that network conditions are continuing to improve, such as based on detecting a continued improvement in bandwidth of one or more networks 125. The video player 135 may then switch up again from medium-quality version 102 to high-quality version 101, such as by requesting high-quality segment 144 of high-quality version 101 as the next segment.

In some cases, however, such as when a video player experiences a rapid and/or unexpected decline in network conditions, a buffer empty condition may occur during a segment download, before the recipient has an opportunity to switch down to the lower quality version for the next segment. This may result in an emptying of the video buffer 134. For example, as shown in FIG. 1, video player 135 may experience a rapid decline in network conditions during the download of high-quality segment 144, resulting in a buffer empty condition 151 that occurs before the high-quality segment 144 can be fully downloaded. If the bandwidth reduction is significant, the remaining download time can cause long re-buffering times, potentially resulting in user dissatisfaction and abandonment. In order to alleviate these and other problems, the techniques described herein may, such as in response to buffer empty condition 151, allow the video player 135 to optionally cancel delivery of a remaining portion of high-quality segment 144 and instead download a lower quality segment (a corresponding segment from either medium-quality version 102 or low-quality version 103) as a substitute for the remaining portion of the current segment. As will be described in detail below, the determination to optionally switch to a lower quality version may be based on a data size comparison 133 between a remaining data size of the current segment (i.e., high-quality segment 144) and the total data sizes of each of the lower quality segments.

Figure 2:
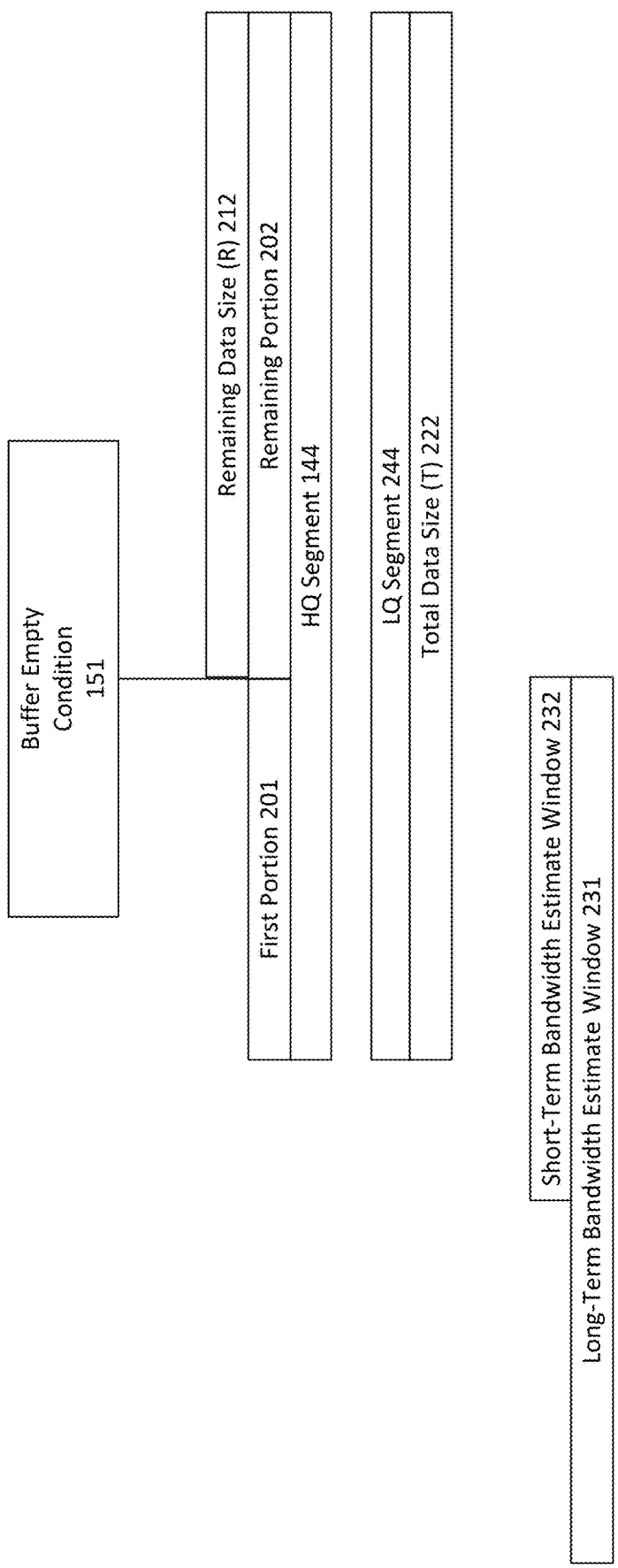
FIG. 2 is diagram illustrating example total and remaining segment data sizes that may be used in accordance with the present disclosure.

Referring now to FIG. 2, some examples of remaining and total data sizes will now be described in detail. As shown in FIG. 2, buffer empty condition 151 occurs during download of high-quality segment 144. When the buffer empty condition occurs, a first portion 201 of the high-quality segment 144 has been downloaded and played by the video player 135. By contrast, a remaining portion 202 of the high-quality segment 144 has not been downloaded or played by the video player 135 when the buffer empty condition 151 occurs. Specifically, in some examples, the first portion 201 of the high-quality segment 144 may include one or more frames of the high-quality segment 144 that have been downloaded by the video player 135 prior to occurrence of the buffer empty condition 151, while the remaining portion 202 of the high-quality segment 144 may include one or more frames of the high-quality segment 144 that have not been downloaded by the video player 135 prior to occurrence of the buffer empty condition 151. Upon occurrence of the buffer empty condition 151, the video player may determine a remaining data size (R) 212 of the remaining portion 202 of the high-quality segment 144. The video player 135 may also identify one or more other versions (i.e., medium-quality version 102 and low-quality version 103) that have a lower image quality then the version of the current video segment (i.e., high-quality version 101). The video player 135 may then examine the corresponding segments from these lower quality versions to determine whether or not the remaining data size 212 of the high-quality segment 144 exceeds the total data size of the lower quality segment.

Figure 3:
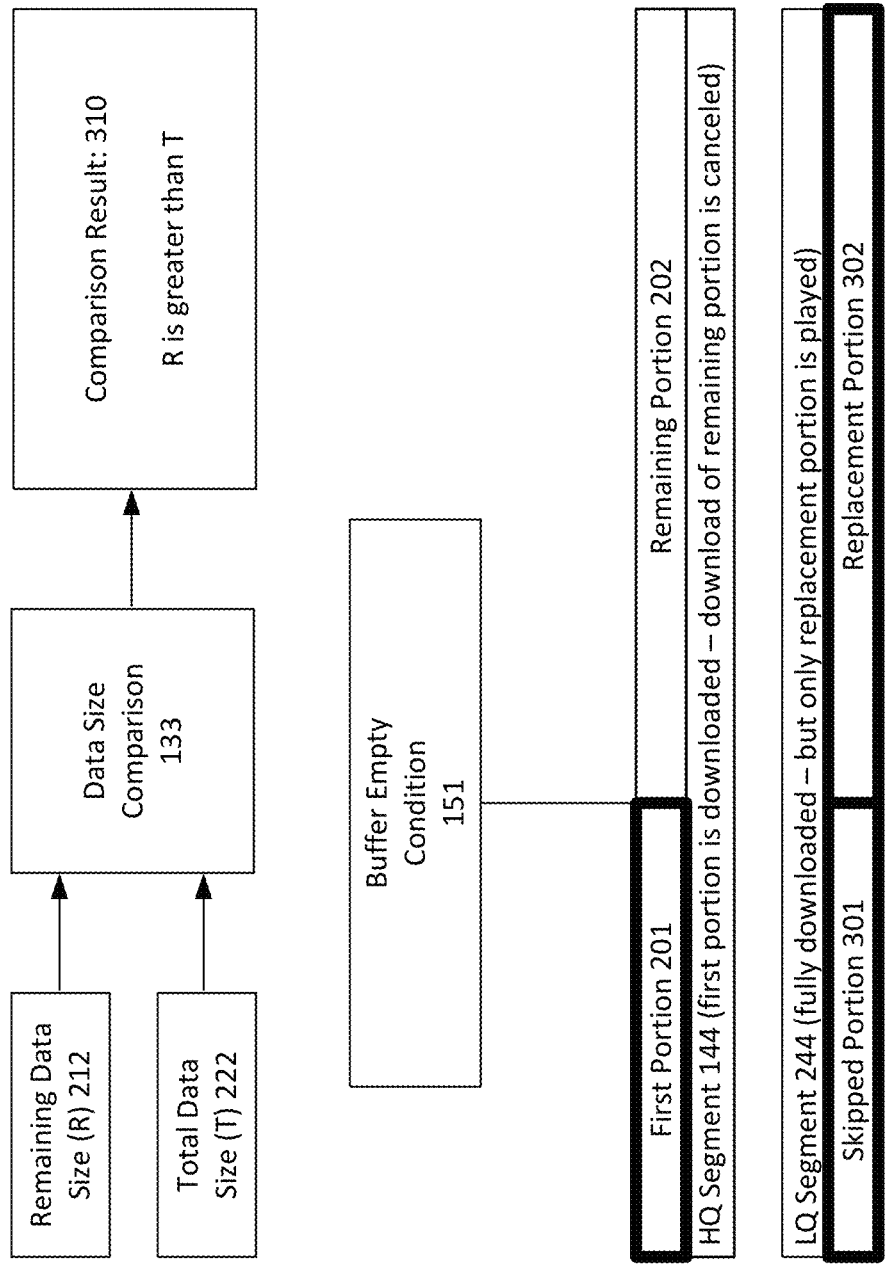
FIG. 3 is a diagram illustrating a first example data size comparison that may be used in accordance with the present disclosure.
Figure 4:
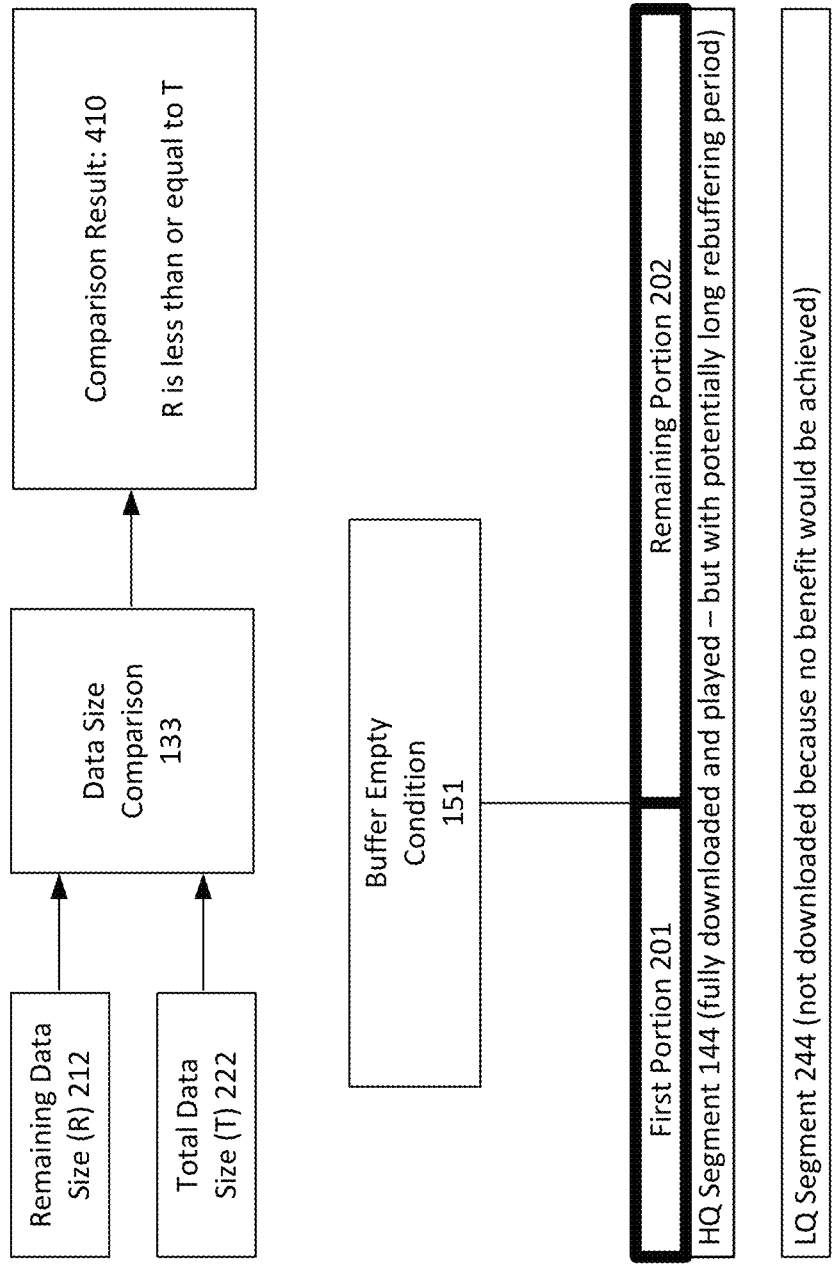
FIG. 4 is a diagram illustrating a second example data size comparison that may be used in accordance with the present disclosure.

FIGS. 2-4 show examples in which the remaining data size 212 of the high-quality segment 144 is compared to a low-quality segment 244 from low-quality version 103. Specifically, the low-quality segment 244 corresponds to high-quality segment 144 such that it includes the same video content as the high-quality segment 144 albeit at a lower image quality (e.g., lower resolution, lower encoding bitrate, etc.). It is noted that, in some examples, the same comparisons depicted in FIGS. 2-4 may also optionally be made between the high-quality segment 144 and a corresponding medium-quality segment of medium-quality version 102.

As shown in FIG. 2, in addition to the remaining data size 212 of the high-quality segment 144, the video player 135 may also determine a total data size (T) 222 of the low-quality segment 244. In some examples, the video player may determine the remaining data size 212 of the high-quality segment 144 and the total data size 222 of the low-quality segment 244 based on content length headers for the high-quality segment 144 and the low-quality segment 244. For example, hypertext transfer protocol (HTTP), which is a commonly employed data transmission protocol for video streaming, may include a content length header in its responses. In some cases, the video player 135 may determine the remaining data size 212 by subtracting the amount of already downloaded data for high-quality segment 144 from the total data size of the high-quality segment 144. In some examples, the remaining data size 212 and/or total data size 222 may be measured as a number of bytes or other amounts of data. It is noted that the term data size, as used herein, such as for remaining data size 212 and/or total data size 222, may refer to an amount of data and may refer to both an exact known data amount or an estimated data amount. Accordingly, in some examples, even when a data size of a segment is not known by video player 135, its size may sometimes be estimated, for example based on data sizes of previous segments, such as previous segments of the same version that have been received and played by the video player 135. For example, the size of the low-quality segment 244 may be estimated based on the size of previous low-quality segments that have been received and played by the video player 135, such as low-quality segment 142 of FIG. 1.

Referring now to FIGS. 3 and 4, some example data size comparisons will now be described in detail. Specifically, as shown in FIG. 3, the video player 135 may perform a data size comparison 133 between the remaining data size 212 of the high-quality segment 144 and the total data size 222 of the low-quality segment 244 to obtain a comparison result 310. For example, the video player 135 may compare an exact or estimated number of bytes in the remaining data size 212 to an exact or estimated number of bytes the total data size 222 to determine which is larger. In the example of FIG. 3, comparison result 310 indicates that the remaining data size (R) 212 is greater than the total data (T) size 222. This means that the video player 135 could reduce the amount of data that it will download by cancelling the download of the remaining portion 202 of the high-quality segment 144 and instead downloading the entire low-quality segment 244 and using a replacement portion 302 of the low quality segment as a substitute for the remaining portion 202 of the high-quality segment 144. This may reduce the re-buffering period and allow the video playback to resume faster.

Accordingly, as shown in FIG. 3, the video player 135 cancels the download of the remaining portion 202 of the high-quality segment 144. This is indicated in FIG. 3 by the bold outline of first portion 201 (to show that it is downloaded by the video player 135) and the thin outline of remaining portion 202 (to show that it is not downloaded by the video player 135). Rather than downloading remaining portion 202, the video player 135 instead requests download of the low-quality (LQ) segment 244 (in its entirety). It is noted, however, that, although the video player 135 may download the entire low-quality segment 244, it is not advantageous for the video player 135 to play the entire low-quality segment 244. This is because a portion of the low-quality segment 244 (represented by skipped portion 301) corresponds to the first portion 201 of the high-quality segment 144 that has already been downloaded and played by the video player 135 prior to the buffer empty condition 151. Thus, if the video player 135 were to play the skipped portion 301 of the low-quality segment 244, then this would appear to the viewer to be a repeat of the first portion 201 of the high-quality segment 144. Accordingly, the video player may skip past the skipped portion 301 of the low-quality segment 244 such that the skipped portion 301 of the low-quality segment 244 is not played by the video player 135. Instead, the video player 135 may advance to the replacement portion 302 of the low-quality segment 244 and resume playback at the beginning (e.g., initial frame) of the replacement portion 302. In FIG. 3, both skipped portion 301 and replacement portion 302 are shown in bold outline to indicate that they may both be downloaded by the video player 135. However, in some examples, although both are downloaded, only the replacement portion 302 may be played.

In some examples, in order to allow playback to be resumed at the start of the replacement portion 302 (and to allow the skipped portion 301 to be skipped) the video player 135 may identify and store a marker that indicates the end of the first portion 201 (e.g., the last downloaded frame of first portion 201), such as a frame number. Upon receiving the low-quality segment 244, the video player 135 may then identify the same offset (e.g., frame number) within the low-quality segment 144, which would correspond to the last frame of the skipped portion 301. The video player may then identify the next frame after the last frame of the skipped portion 301, which would be the first frame of the replacement portion 302, and resume playback starting at this next frame. In some examples, as an alternative to storing the last frame of the first portion 201, the video player 135 may perform other similar techniques, such as incrementing the last frame of the first portion 201 by one frame and storing this incremented frame number. The video player 135 may then resume playback directly from the incremented frame number in the low-quality segment 144, which would correspond to the first frame of the replacement portion 302.

Referring now to FIG. 4, another example is shown in which data size comparison 133 yields a different result than in the example of FIG. 3. Specifically, in the example of FIG. 4, the video player 135 may perform a data size comparison 133 between the remaining data size 212 of the high-quality segment 144 and the total data size 222 of the low-quality segment 244 to obtain a comparison result 410. For example, the video player 135 may compare an exact or estimated number of bytes in the remaining data size 212 to an exact or estimated number of bytes the total data size 222 to determine which is larger. However, in the example of FIG. 4, comparison result 410 indicates that the remaining data size (R) 212 is less than or equal to the total data (T) size 222. This means that no benefit would be achieved by cancelling the download of the remaining portion 202 of the high-quality segment 144. Accordingly, in the example of FIG. 4, the video player 135 does not cancel the download of the high-quality segment 144. The video player 135 instead downloads the entire high-quality segment, as indicated by the thick outlining surrounding first portion 201 and remaining portion 202 in FIG. 4. In this scenario, the video player downloads and plays the remaining portion 202 as it becomes available. It is noted that, in some examples, the comparison result 310 of FIG. 3 may be more common in scenarios where there are larger differences in image qualities of the high-quality version 101 and the low-quality version 103, while the comparison result 410 of FIG. 4 may be more common in scenarios where there are smaller differences in image qualities of the high-quality version 101 and the low-quality version 103.

As described above, in some examples, there may be multiple available versions with lower image qualities than the current version that is being downloaded when the buffer empty condition occurs. For example, in the case of buffer empty condition 151 that occurs during download of high-quality segment 144, there are two lower image quality versions (medium-quality version 102 and low-quality version 103) from which corresponding segments could potentially be downloaded as a substitution for the high-quality segment 144. In these scenarios, the video player 135 may, for example, perform the above described data size comparison for more than one (and in some cases all) of those lower quality versions to determine which, if any, of those lower quality versions have a total data size that is exceeded by the remaining data size 212 of the current version. As noted above, while FIGS. 2-4 depict comparisons of the remaining data size 212 of the high-quality segment 144 to a total data size 222 of a corresponding low-quality segment 144, similar data size comparisons may also be made for a total size of a corresponding medium-quality segment. In some examples, to improve efficiency, the comparison could first be attempted for the corresponding segment with the lowest available image quality. If the total data size of this lowest image quality segment exceeds the remaining data size 212 of the current version, that it may be assumed that the data sizes of all other available lower quality versions will also exceed the remaining data size 212 of the current version.

In some examples, the video player 135 may maintain both a long-term bandwidth estimate and a short-term bandwidth estimate. In some cases, the long-term bandwidth estimate and the short-term bandwidth estimate may be based on respective sliding time windows relative to a current time. For example, the long-term bandwidth estimate may be repeatedly updated based on a longer prior time window (e.g., bandwidth conditions over the last ten seconds), while the short-term bandwidth estimate may be repeatedly updated based on a shorter prior time window (e.g., bandwidth conditions over the last two seconds). For example, referring back to FIG. 2, a short-term bandwidth estimate window 232 and a long-term bandwidth estimate window 231 are shown relative to the time of occurrence of the buffer empty condition 151. In some cases, the long-term bandwidth estimate may be used to select (and optionally switch between) versions for each video segment under normal operating conditions (i.e., when the video content is not experiencing a buffer empty condition). For example, in some cases, the long-term bandwidth estimate may be used to switch between versions after a segment has been fully downloaded, such as to perform the switches between versions that are shown in FIG. 1 (e.g., from medium-quality segment 141 to low-quality segment 142, from low-quality segment 142 to medium-quality segment 143, from medium-quality segment 143 to high-quality segment 144). By contrast, the short-term bandwidth estimate may be used to select (and optionally switch between) versions when a buffer empty condition 151 has occurred. In particular, in some examples, the long-term bandwidth estimate may be preferable for use in normal operating conditions because it may be less susceptible to temporary changes in bandwidth.

By contrast, in some examples, the short-term bandwidth estimate may be preferable for use in buffer empty conditions because it may provide a more accurate estimate of a current decline in bandwidth that has caused the buffer empty condition. In particular, in some examples, when a buffer empty condition has occurred and it is determined that multiple lower quality versions have a total data size that is exceeded by the remaining data size of the current version, the short-term bandwidth estimate may be used to select one of those multiple lower quality versions to which to switch and replace the remaining portion of the current higher quality version. For example, consider a scenario in which the remaining data size 212 of the high-quality segment 144 exceeds the total data size 222 of the low-quality segment 244 (as shown in the example of FIG. 3) and also exceeds the total data size of a corresponding medium-quality segment from medium-quality version 102. In this example, the video player could obtain a benefit by switching from the high-quality segment 144 to either one of the low-quality segment 244 or the corresponding medium-quality segment. In this example, the video player 135 may employ the short-term bandwidth estimate to choose between the low-quality segment 244 or the corresponding medium-quality segment as a substitute for the high-quality segment 144. For example, the video player 135 could use the short-term bandwidth estimate to determine whether downloading of the medium-quality segment would still result in a re-buffering delay (or would exceed a threshold acceptable delay). If the downloading of the medium-quality segment would not result in a delay (or an unacceptable delay), then the medium-quality segment could be selected. By contrast, if the downloading of the medium-quality segment would result in a delay (or an unacceptable delay), then the low-quality segment 244 could be selected.

Figure 5:
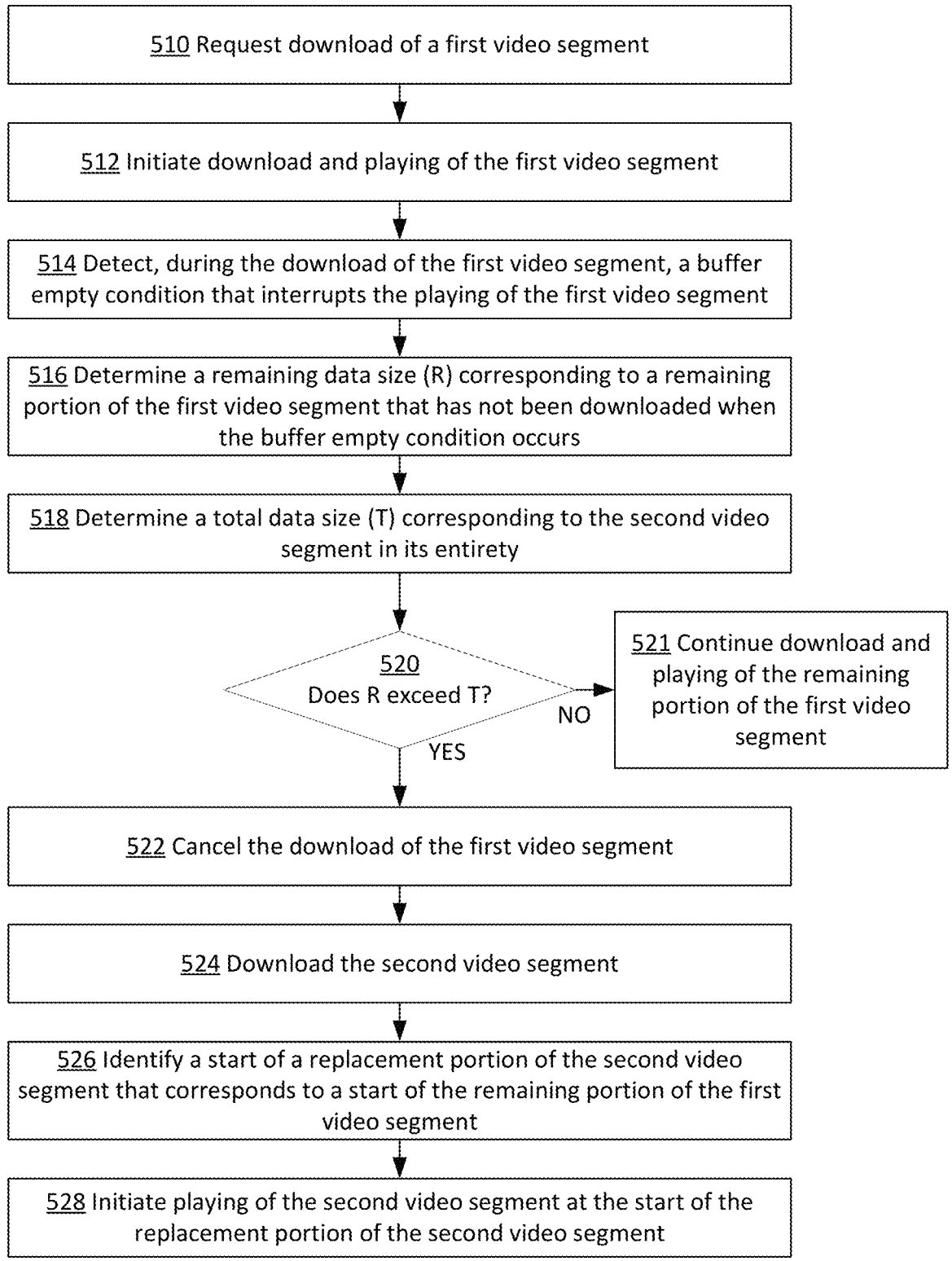
FIG. 5 is a flowchart illustrating an example size comparison-based segment cancellation process that may be used in accordance with the present disclosure.

FIG. 5 is a flowchart illustrating an example size comparison-based segment cancellation process that may be used in accordance with the present disclosure. The process of FIG. 5 is initiated at operation 510, at which download of a first video segment (e.g., HQ segment 144 of FIG. 2) of video content is requested, for example by a video player (e.g., video player 135 of FIG. 1). As described above, the video content may be transmitted using ABR streaming techniques, in which video content is encoded using multiple versions that may differ with respect to various image quality attributes (e.g., bitrates, resolutions, profiles, frame rates, etc.). For example, FIG. 1 shows video content encoded into an HQ version 101, and MQ version 102, and an LQ version 103. Each recipient of the transmission may then determine which version to download depending on various transmission characteristics, such as network conditions (e.g., available network bandwidth, throughput, etc.). In ABR streaming, video streams are encoded into small segments. For different segments, recipients may optionally dynamically switch between versions, such as based on whether network conditions are improving or declining. A plurality of video segments may be created that correspond to a same portion of the video content in a streaming transmission of the video content. The plurality of video segments may include the first video segment (e.g., HQ segment 144 corresponding to HQ version 101) and a second video segment (e.g., LQ segment 244 corresponding to LQ version 103) and optionally other video segments (e.g., an MQ video segment corresponding to MQ version 102). The first video segment may have a first image quality (e.g., 1080p resolution), while the second video segment may have a second image quality (e.g., 480p resolution). The first image quality may be higher than the second image quality.

At operation 512, the download and playing of the first video segment is initiated, for example by a video player (e.g., video player 135 of FIG. 1). At operation 514, a buffer empty condition is detected, during the download of the first video segment, that interrupts the playing of the first video segment. For example, in some cases, a video player may detect that a buffer empty condition has occurred when it temporarily ceases to receive video from the video buffer. At operation 516, a remaining data size (R) is determined corresponding to a remaining portion of the first video segment that has not been downloaded when the buffer empty condition occurs. At operation 518, a total data size (T) is determined corresponding to the second video segment in its entirety. As described above, in some examples, the video player may determine the remaining data size of the first video segment and the total data size of the second video segment based on content length headers for the first video segment and the second video segment. For example, hypertext transfer protocol (HTTP), which is a commonly employed data transmission protocol for video streaming, may include a content length header in its responses. In some cases, the video player may determine the remaining data size by subtracting the amount of already downloaded data for first video segment from the total data size of the first video segment. In some examples, the remaining data size and/or total data size may be measured as a number of bytes or other amounts of data. Even when a data size of a segment is not known by the video player, its size may sometimes be estimated, for example based on data sizes of previous segments, such as previous segments from the same version that have been received and played by the video player.

At operation 520, it is determined whether the remaining data size (R) of the first video segment exceeds the total data size (T) of the second video segment. If the remaining data size (R) of the first video segment does not exceed the total data size (T) of the second video segment, then, at operation 521, the video player may continue to download and play the first video segment (albeit with a likely delay due to the buffer empty condition). An example of the scenario in which the remaining data size (R) of the first video segment does not exceed (i.e., is less than or equal to) the total data size (T) of the second video segment is shown in FIG. 4 and described above. In this scenario, because the remaining data size (R) of the first video segment does not exceed (i.e., is less than or equal to) the total data size (T) of the second video segment, there is no benefit to switching to the second video segment.

By contrast, if the remaining data size (R) of the first video segment exceeds the total data size (T) of the second video segment, then switching to the second video segment may provide a benefit by reducing the amount of data that needs to be downloaded (and therefore the amount of time required to download the data). An example of the scenario in which the remaining data size (R) of the first video segment exceeds the total data size (T) of the second video segment is shown in FIG. 3 and described above. In this scenario, at operation 522, the video player may cancel the download of the first video segment, whereby the remaining portion of the first video segment is not downloaded. At operation 524, the video player downloads the second video segment. At operation 526, the video player identifies a start of a replacement portion of the second video segment that corresponds to a start of the remaining portion of the first video segment. At operation 528, the video player initiates playing of the second video segment from the start of the replacement portion of the second video segment. As described above, a skipped portion (e.g., skipped portion 301 of FIG. 3) of the second video segment may precede the replacement portion (e.g., skipped portion 302 of FIG. 3) of the second video segment, and the skipped portion of the second video segment may be skipped over and not played. As also described above, the start of the replacement portion of the second video segment may be identified based at least in part on a last played frame of the first video segment. For example, the playing of the second video segment may be initiated from a frame number immediately following a frame number of the last played frame of the first video segment. Specifically, in order to allow playback to be resumed at the start of the replacement portion (and to allow the skipped portion to be skipped) the video player may identify and store a marker that indicates the end of the played portion (e.g., first portion 201 of FIG. 2) of the first video segment (e.g., the last downloaded frame of the played portion of the first video segment), such as a frame number. Upon receiving the second video segment, the video player may then identify the same offset (e.g., frame number) within the second video segment, which would correspond to the last frame of the skipped portion of the second video segment. The video player may then identify the next frame after the last frame of the skipped portion, which would be the first frame of the replacement portion, and resume playback starting at this next frame. In some examples, as an alternative to storing the last frame of the played portion of the first video segment, the video player may perform other similar techniques, such as incrementing the last frame of the played portion by one frame and storing this incremented frame number. The video player may then resume playback directly from the incremented frame number in the second video segment, which would correspond to the first frame of the replacement portion.

As described above, in some examples, prior to operation 510, the video player may select the first video segment for downloading based at least in part on a first bandwidth estimate (e.g., a long-term bandwidth estimate) associated with a first time window (e.g., long-term bandwidth estimate window 231). Additionally, in some examples, prior to operation 524, the video player may select the second video segment for downloading based in part on a second bandwidth estimate (e.g., a short-term bandwidth estimate) associated with a second time window (e.g., short-term bandwidth estimate window 232). The first time window may have a longer duration than the second time window. Also, the first time window and the second time window may be sliding time windows, such as moving average time windows. For example, the first bandwidth estimate may be repeatedly updated based on the first time window (e.g., bandwidth conditions over the last ten seconds), while the second bandwidth estimate may be repeatedly updated based on the second time window (e.g., bandwidth conditions over the last two seconds). In some cases, the first (e.g., long-term) bandwidth estimate may be used to select (and optionally switch between) versions for each video segment under normal operating conditions (i.e., when the video content is not experiencing a buffer empty condition). By contrast, in some examples, the second (e.g., short-term) bandwidth estimate may be preferable for use in buffer empty conditions because it may provide a more accurate estimate of a current decline in bandwidth that has caused the buffer empty condition. In particular, in some examples, when a buffer empty condition has occurred and it is determined that multiple lower quality versions have a total data size that is exceeded by the remaining data size of the current version, the short-term bandwidth estimate may be used to select one of those multiple lower quality versions to which to switch and replace the remaining portion of the current higher quality version.

It is noted that many of the above examples relate to canceling the first video segment in response to a buffer empty condition. In some examples, switching of renditions in response to a buffer empty condition may be preferable because the user is already experiencing a playback delay and may, therefore, not be able to perceive any delay from switching of the video content from one version to another. It is noted, however, that there is no requirement that a buffer must be completely emptied before determining whether or not to cancel download of a current segment and switch to a lower quality segment. For example, in some cases, this determination may be performed in response to detection of an error condition associated with the download of the first video segment. In particular, the term error condition, as used herein, refers to a transmission-related error and may include detecting of a buffer empty condition, detecting of a condition corresponding to an amount of buffered video data being reduced to a threshold level, and/or detecting of other transmission related errors (e.g., a disconnection, lost and/or missing data, etc.). Thus, in some examples, instead of detecting a buffer empty condition, operation 514 of FIG. 5 may include detecting an error condition associated with the download of the first video segment. The remaining operations 516-528 may then be performed in response to the detected error condition. In some cases, this error condition may be a buffer empty condition—and the threshold level may be a completely empty buffer. However, in other cases, the threshold may be set to an amount higher than zero, meaning that the buffer need not be completely emptied. In these examples, when this error condition occurs and the amount of data in the buffer is reduced to the selected threshold level, the remaining operations 516-528 may be performed in response to this condition (even though the buffer is not completely emptied). In yet other examples, the error condition may include one or more other transmission-related errors (e.g., a disconnection, lost and/or missing data, etc.), and the remaining operations 516-528 may be performed in response to detection of these other transmission-related errors.

Figure 6:
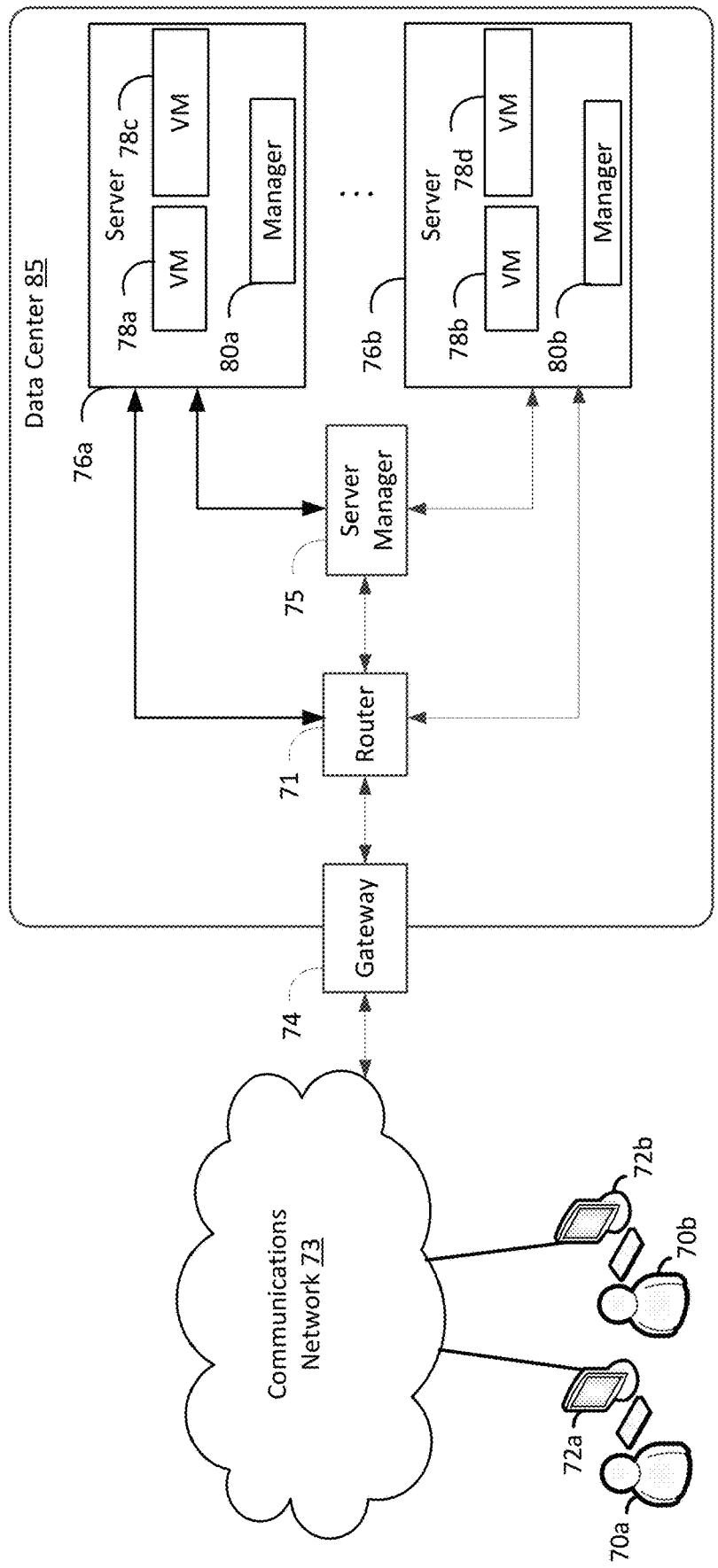
FIG. 6 is a diagram illustrating an example system for transmitting and providing data that may be used in accordance with the present disclosure.

An example system for transmitting and providing data will now be described in detail. In particular, FIG. 6 illustrates an example computing environment in which the embodiments described herein may be implemented. FIG. 6 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 6 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 6, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 6, a server manager 75 is also employed to at least in part direct various communications to, from and/or between servers 76a and 76b. While FIG. 6 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 85 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 7:
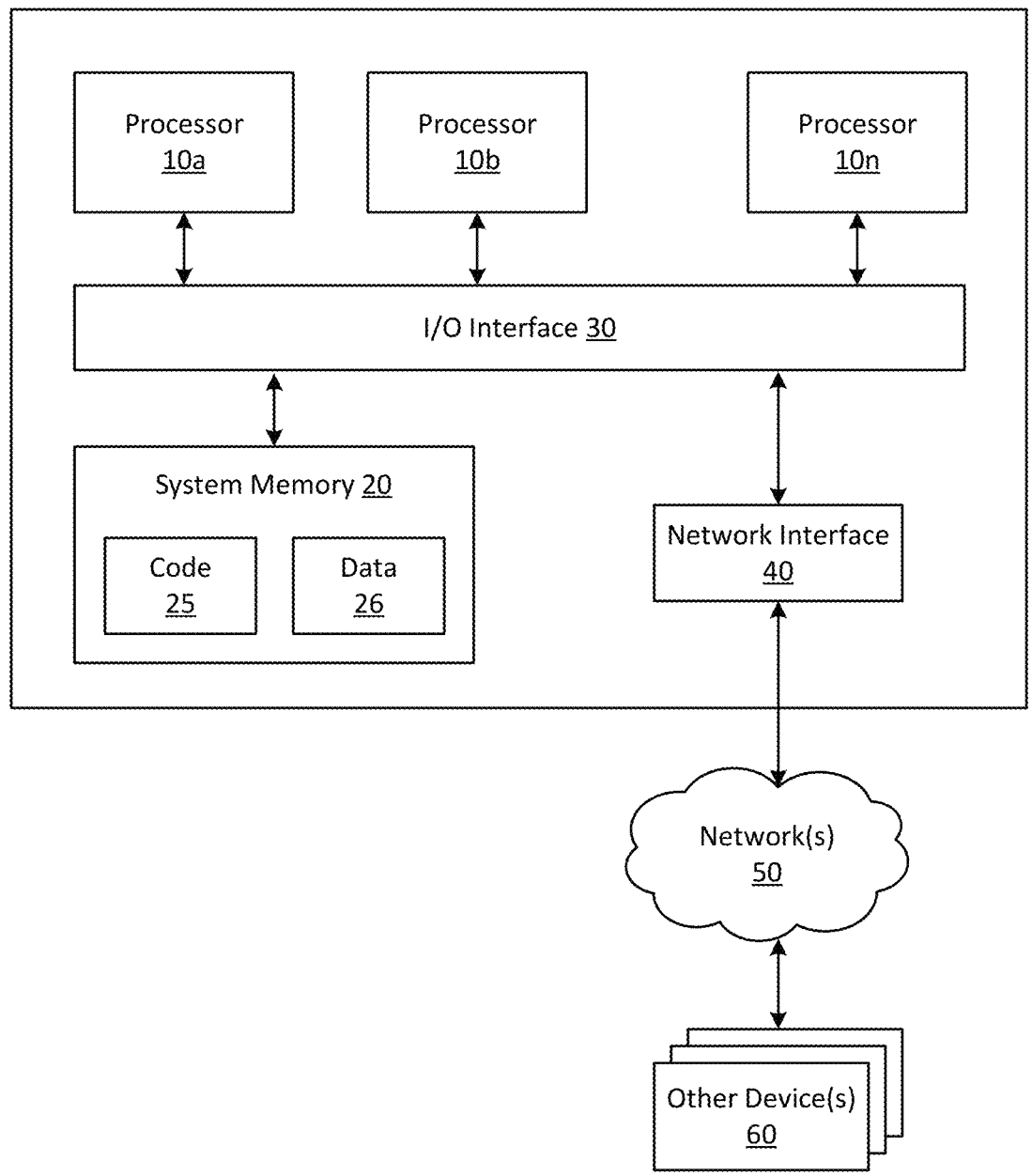
FIG. 7 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 7 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein computing instructions that, upon execution by the one or more processors, cause the computing system to perform operations comprising:
requesting download of a first video segment, wherein a plurality of video segments are created that correspond to a same portion of video content in a streaming transmission of the video content, the plurality of video segments including the first video segment and a second video segment, the first video segment having a first image quality, the second video segment having a second image quality, wherein the first image quality is higher than the second image quality;

initiating the download of the first video segment;
initiating playing of the first video segment;
detecting, during the download of the first video segment, a buffer empty condition that interrupts the playing of the first video segment;
determining a remaining data size corresponding to a remaining portion of the first video segment that has not been downloaded when the buffer empty condition occurs;
determining a total data size corresponding to the second video segment in its entirety;
determining that the remaining data size exceeds the total data size;
canceling the download of the first video segment, whereby the remaining portion of the first video segment is not downloaded;
downloading the second video segment;
identifying a start of a replacement portion of the second video segment that corresponds to a start of the remaining portion of the first video segment; and
initiating playing of the second video segment from the start of the replacement portion of the second video segment.

2. The computing system of claim 1, wherein the first video segment is selected for downloading based at least in part on a first bandwidth estimate associated with a first time window.

3. The computing system of claim 2, wherein the second video segment is selected for downloading based in part on a second bandwidth estimate associated with a second time window.

4. The computing system of claim 3, wherein the first time window has a longer duration than the second time window.

5. A computer-implemented method comprising:
requesting download of a first video segment, wherein a plurality of video segments are created that correspond to a same portion of video content in a streaming transmission of the video content, the plurality of video segments including the first video segment and a second video segment, the first video segment having a first image quality, the second video segment having a second image quality, wherein the first image quality is higher than the second image quality;
initiating the download of the first video segment;
initiating playing of the first video segment;
detecting an error condition associated with the download of the first video segment;
determining a remaining data size corresponding to a remaining portion of the first video segment that has not been downloaded when the error condition occurs;
determining a total data size corresponding to the second video segment in its entirety;
determining that the remaining data size exceeds the total data size;
canceling the download of the first video segment, whereby the remaining portion of the first video segment is not downloaded;
downloading the second video segment; and
initiating playing of the second video segment from a start of a replacement portion of the second video segment that corresponds to a start of the remaining portion of the first video segment.

6. The computer-implemented method of claim 5, wherein a skipped portion of the second video segment precedes the replacement portion of the second video segment, and wherein the skipped portion of the second video segment is skipped over and not played.

7. The computer-implemented method of claim 5, wherein the first video segment is selected for downloading based at least in part on a first bandwidth estimate associated with a first time window.

8. The computer-implemented method of claim 7, wherein the second video segment is selected for downloading based in part on a second bandwidth estimate associated with a second time window.

9. The computer-implemented method of claim 8, wherein the first time window has a longer duration than the second time window.

10. The computer-implemented method of claim 8, wherein the first time window and the second time window are moving average time windows.

11. The computer-implemented method of claim 8, wherein the error condition is at least one of a buffer empty condition, a condition corresponding to an amount of buffered video data being reduced to a threshold level, or another transmission-related error.

12. The computer-implemented method of claim 8, further comprising identifying the start of a replacement portion of the second video segment based at least in part on a last played frame of the first video segment.

13. One or more non-transitory computer-readable storage media having stored thereon computing instructions that, upon execution by one or computing devices, cause the one or more computing devices to perform operations comprising:
requesting download of a first video segment, wherein a plurality of video segments are created that correspond to a same portion of video content in a streaming transmission of the video content, the plurality of video segments including the first video segment and a second video segment, the first video segment having a first image quality, the second video segment having a second image quality, wherein the first image quality is higher than the second image quality;
initiating the download of the first video segment;
initiating playing of the first video segment;
detecting an error condition associated with the download of the first video segment;
determining a remaining data size corresponding to a remaining portion of the first video segment that has not been downloaded when the error condition occurs;
determining a total data size corresponding to the second video segment in its entirety;
determining that the remaining data size exceeds the total data size;
canceling the download of the first video segment, whereby the remaining portion of the first video segment is not downloaded;
downloading the second video segment; and
initiating playing of the second video segment from a start of a replacement portion of the second video segment that corresponds to a start of the remaining portion of the first video segment.

14. The one or more non-transitory computer-readable storage media of claim 13, wherein a skipped portion of the second video segment precedes the replacement portion of the second video segment, and wherein the skipped portion of the second video segment is skipped over and not played.

15. The one or more non-transitory computer-readable storage media of claim 13, wherein the first video segment is selected for downloading based at least in part on a first bandwidth estimate associated with a first time window.

16. The one or more non-transitory computer-readable storage media of claim 15, wherein the second video segment is selected for downloading based in part on a second bandwidth estimate associated with a second time window.

17. The one or more non-transitory computer-readable storage media of claim 16, wherein the first time window has a longer duration than the second time window.

18. The one or more non-transitory computer-readable storage media of claim 13, wherein the first time window and the second time window are moving average time windows.

19. The one or more non-transitory computer-readable storage media of claim 13, wherein the error condition is at least one of a buffer empty condition, a condition corresponding to an amount of buffered video data being reduced to a threshold level, or another transmission-related error.

20. The one or more non-transitory computer-readable storage media of claim 13, further comprising identifying the start of a replacement portion of the second video segment based at least in part on a last played frame of the first video segment.

\* \* \* \* \*